(12) United States Patent
Mullee

(10) Patent No.: US 6,660,875 B1
(45) Date of Patent: Dec. 9, 2003

(54) ION EXCHANGE PURIFICATION OF DIELECTRIC CONDENSATE PRECURSOR FLUIDS AND SILICATE ESTERS SUCH AS TETRAETHYLORTHOSILICATE (TEOS)

(75) Inventor: William H. Mullee, Portland, OR (US)

(73) Assignee: PPT Technologies, LLC, Portland, OR (US)

( * ) Notice: Subject to any disclaimer, the term of this patent is extended or adjusted under 35 U.S.C. 154(b) by 0 days.

(21) Appl. No.: 09/327,975

(22) Filed: Jun. 8, 1999

Related U.S. Application Data

(60) Provisional application No. 60/088,579, filed on Jun. 9, 1998.

(51) Int. Cl.$^7$ .................................................. C07F 7/08
(52) U.S. Cl. ........................ 556/466; 556/400; 422/243; 437/1
(58) Field of Search ................................ 556/466, 400; 422/243; 437/1

(56) References Cited

U.S. PATENT DOCUMENTS

| | | | |
|---|---|---|---|
| 4,136,021 A | 1/1979 | Whitehurst | 208/251 R |
| 4,156,689 A | 5/1979 | Ashby et al. | 260/448.2 E |
| 4,795,565 A | 1/1989 | Yan | 210/669 |
| 5,162,084 A | 11/1992 | Cummings et al. | 210/662 |
| 5,198,513 A | 3/1993 | Clement et al. | 526/242 |
| 5,210,265 A | 5/1993 | Clement et al. | 558/230 |
| 5,234,789 A | 8/1993 | Favier, Jr. et al. | 430/165 |
| 5,284,930 A | 2/1994 | Matsumoto et al. | 528/482 |
| 5,364,917 A | 11/1994 | Babb et al. | 526/242 |
| 5,525,315 A | 6/1996 | Burke | 423/24 |
| 5,580,700 A | 12/1996 | Rahman | 430/311 |
| 5,674,662 A | 10/1997 | Szmanda et al. | 430/270.1 |
| 5,702,611 A | 12/1997 | Gronbeck et al. | 210/686 |
| 5,840,953 A | 11/1998 | Potts | 556/483 |
| 5,843,209 A | 12/1998 | Ray et al. | 95/52 |
| 5,854,302 A | 12/1998 | Foster et al. | 522/172 |
| 5,902,893 A | * 5/1999 | Laxman | 556/466 |
| 5,905,117 A | 5/1999 | Yokotsuka et al. | 525/104 |
| 5,919,892 A | 7/1999 | Hwang et al. | 528/220 |
| 5,939,507 A | 8/1999 | Okawa | 528/12 |
| 5,959,157 A | 9/1999 | Lau et al. | 568/717 |
| 5,965,679 A | 10/1999 | Godschalx et al. | 526/281 |
| 5,973,095 A | 10/1999 | Hacker et al. | 528/12 |
| 5,985,969 A | 11/1999 | Harris et al. | 524/233 |
| 5,986,045 A | 11/1999 | Lau et al. | 528/401 |
| 5,990,356 A | 11/1999 | Commarieu et al. | 568/37 |
| 6,005,132 A | 12/1999 | Weidner et al. | 556/469 |
| 6,059,857 A | 5/2000 | Ray et al. | 95/52 |
| 6,060,170 A | 5/2000 | Burgoyne, Jr. | 428/457 |
| 6,123,850 A | 9/2000 | Commarieu et al. | 210/662 |
| 6,124,421 A | 9/2000 | Lau et al. | 528/169 |

FOREIGN PATENT DOCUMENTS

| | | | |
|---|---|---|---|
| GB | 2 088 850 A | 6/1982 | C07D/207/267 |
| JP | 04065415 | 3/1992 | C08G/8/12 |
| JP | 05148306 | 6/1993 | C08F/2/06 |
| JP | 05148309 | 6/1993 | C08F/6/08 |
| SU | 2032655 | 4/1995 | C07C/29/76 |
| WO | 9710193 | 3/1997 | |
| WO | WO 97/19057 | 5/1997 | C07C/315/06 |

OTHER PUBLICATIONS

Buragohain, Partha V., "Novel Resin–Based Ultrapurification System for Reprocessing IPA in the Semiconductor Industry," *Ind. Eng. Chem. Res.* 1996, vol. 35, No. 9 (1996), pp. 3149–3154.

Fleming, C.A., "On the Extraction of Various Base Metal Chlorides From Polar Organic Solvents Into Cation and Anion Exchange Resins," *Hydometallurgy* 4 (1979), pp. 159–167.

Myakon'kii, A.G., et al., "Purification of Alcohols With Respect to Electron Conductive Impurities By Ion Exchange," *Vysokchistyr Veschestra*, vol. 2 (1992), pp. 71–75.

Samuelson, *Ion Exchange Separations in Analytical Chemistry* (Wiley 1963), Chapter 2, "Fundamental Properties," pp. 28–57.

* cited by examiner

Primary Examiner—Paul F. Shaver
(74) Attorney, Agent, or Firm—Stoel Rives LLP

(57) ABSTRACT

A method of removing inorganic contamination from dielectric condensate precursor fluids and silicate esters, such as tetraethylorthosilicate (TEOS), methyltriethoxyorthosilicate (MTEOS), hydrogen silsesquioxane (HSQ), methyl silsesquioxane (MSQ), polyarylene ether, benzocyclobutene (BCB), or OSG, includes obtaining a commercial grade fluid having up to 10,000 ppb individual metallic contaminants; converting the sodium form of one or more macroporous ion exchange resin beds to a hydrogen form; converting the chloride form of one or more macroporous ion exchange resin beds to a hydroxide form; drying the macroporous ion exchange resin beds to remove substantially all water from the ion exchange resin beds; passing fluids through the ion exchange resin beds one or more times by recirculating all or a portion of the fluid to obtain a purified fluid having less than 1 ppb of individual metallic contaminants, less than 10 ppb of boron contaminants, and less than 1 ppb of chloride contaminants; and collecting the purified fluid product within a container to prevent the subsequent addition of contaminants.

77 Claims, 1 Drawing Sheet

ION EXCHANGE PURIFICATION OF DIELECTRIC CONDENSATE PRECURSOR FLUIDS AND SILICATE ESTERS SUCH AS TETRAETHYLORTHOSILICATE (TEOS)

This application derives priority from U.S. Provisional Application Ser. No. 60/088,579, filed Jun. 9, 1998.

TECHNICAL FIELD

This invention relates to semiconductor device fabrication and processing, and, in particular, to a method and system for removing inorganic contamination from dielectric condensate precursor fluids, such as silicate esters, e.g. tetraethylorthosilicate (TEOS), by passing these fluids through columns of ion exchange resins to increase the purity of the fluids.

BACKGROUND OF THE INVENTION

In the manufacture of modern integrated circuits, for example, contamination of the insulating interlevel dielectric layer material causes many problems and should be reduced as much as possible. Contamination is becoming an increasing problem, particularly as the complexity and density of integrated circuits increase and the feature sizes drop below about 0.25 $\mu$m. Contamination may include contaminants, such as particulates, metallic ions, organic molecules, and other ionic species, that may be suspended or dissolved in the chemicals used for the manufacture of integrated circuits. Chemical processing utilized in the production of the integrated circuits often involves particle and metal removal steps followed by a drying step, interspersed with several rinsing steps.

Chemicals, such as dielectric condensate precursor fluids, are also used to form layers of insulating material between features of integrated circuits. Contaminants contained in such layers deposited on the surface of an integrated circuit substrate are particularly destructive when they are permanently included as part of the integrated circuit. These included contaminants may subsequently migrate to adjoining electrical device features and cause great damage to, or malfunction of, the integrated circuit and significantly reduce the product yield.

Dielectric condensate precursor fluids are typically applied as a fluid (gas, vapor, mist, or liquid) to the surface of an integrated circuit under vacuum and/or heat, and the fluid undergoes a conversion to a solid dielectric condensate. Conventional dielectric condensate precursor fluids include, but are not limited to silicate esters such as tetraethylorthosilicate (TEOS). Commercially available industrial, technical, or other grades of TEOS and other silicate esters typically include individual inorganic contaminants in concentrations up to about 10,000 parts per billion (ppb). Thus, for semiconductor manufacturing and certain other processes, the commercial manufacturer is requested, therefore, to further purify the silicate esters or other dielectric condensate precursor fluids.

Current methods for the purification of TEOS and related organic silicate fluids employ sequential fractional distillation at atmospheric or reduced pressures and higher temperatures. These methods suffer from several drawbacks that include the inability to remove significant amounts of boron and chloride ions, the facilitation of undesirable side reactions at operational temperatures, and the costly safeguards needed for distillation of flammable and hazardous materials.

A safer, less expensive, and more effective method of purifying TEOS, silicate esters, and other dielectric condensate precursor fluids is, therefore, desirable.

SUMMARY OF THE INVENTION

An object of the present invention is, therefore, to provide a system or method for removing contaminants from silicate esters or other dielectric condensate precursor fluids.

The present invention presents a method that employs ion exchange resins to remove metal and other contaminants from dielectric condensate precursor fluids and silicate esters, such as TEOS and to avoid certain drawbacks of the current distillation techniques. Ion exchange resin is currently used for the removal of contaminants from water and a few other chemicals, such as citric acid. The ion exchange resin beads have a positive or negative charge which attract contaminants of the opposite charge. Macroporous ion exchange resins additionally have numerous crevices at the surface of each resin bead. These crevices function to physically trap contaminant molecules, creating a molecular sieve effect that can capture contaminants even when the ion exchange resin is surrounded by an organic fluid.

The present invention includes, therefore, selecting or modifying ion exchange resin to be appropriate for the process, such as by converting the cations to hydrogen and the anions to hydroxide; drying or eliminating water from the ion exchange resin, such as by rinsing the resin with an evaporative alcohol; flushing the ion exchange tanks and associated chemical lines with the fluid to be purified; recirculating the commercial fluid feedstock through tanks of ion exchange resin one or several times to achieve optimum removal of contaminants; and delivering the purified fluid into a closed container to prevent subsequent contamination. The process may be carried out at room temperature and pressure.

Skilled persons will also appreciate that the present invention can be employed in the manufacturing of extremely pure silicate powders or slurries that can, for example, be used to polish silicon wafers.

Additional objects and advantages of this invention will be apparent from the following detailed description of preferred embodiments thereof which proceeds with reference to the accompanying drawings.

DETAILED DESCRIPTION OF THE PREFERRED EMBODIMENTS

Figure 1:
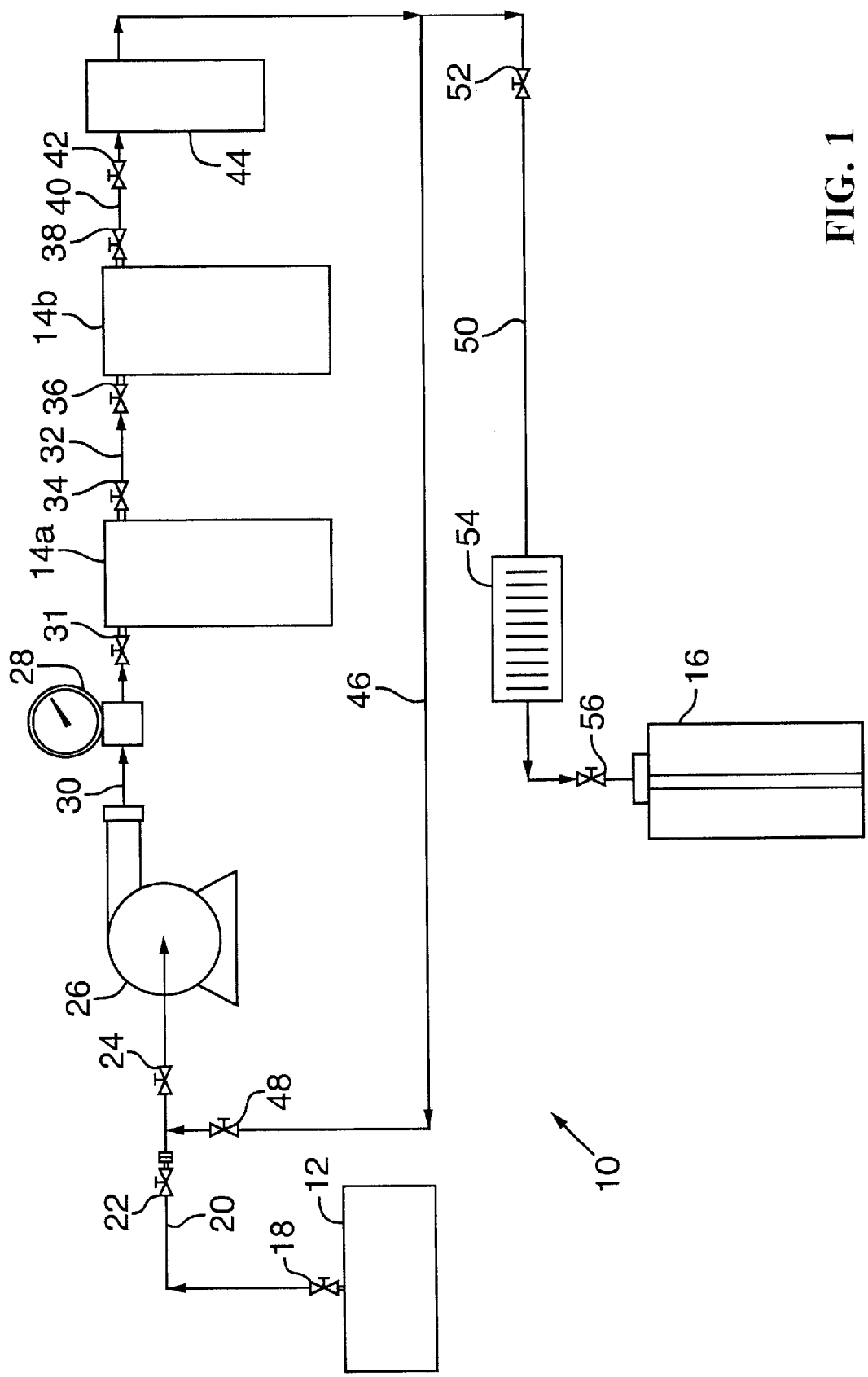
FIG. 1 is a schematic diagram showing a simplified purification system that can be employed to purify dielectric condensate precursor fluids in accordance with the present invention.

With reference to FIG. 1, a simplified purification system 10 that can be employed to purify dielectric condensate precursor fluids in accordance with the present invention includes a supply tank 12, one or more ion exchange tanks 14 (14a and 14b), and a product collection tank 16. Supply tank 12 is supplied with commercially available industrial, technical, or other grades of a dielectric condensate precursor fluid or silicate ester. These grades can be defined as low purity fluids and typically include individual inorganic contaminants in concentrations greater than one part per billion and up to about 10,000 parts per billion (ppb). High purity fluids, on the other hand, can be defined as having less than one part per billion of individual metallic contaminants. Preferred silicate esters include, but are not limited to, tetraethylorthosilicate (TEOS) and methyltriethoxyorthosilicate (MTEOS), and other preferred dielectric condensate precursor fluids include, but are not limited to, hydrogen silsesquioxane (HSQ), methyl silsesquioxane (MSQ), polyarylene ether, benzocyclobutene (BCB), and orthosilicate glass (OSG). These fluids all exhibit adverse interactions with water.

Ion exchange tanks 14 preferably include macroporous strong acid cation and strong base anion ion exchange resins. Each ion exchange tank 14 may include a single mixed bed column of both anion and cation resins, or ion exchange tank 14a may include only cation resins while ion exchange tank 14b may include only anion resins. Skilled persons will appreciate that the order of the separately-charged resin ion exchange tanks 14a and 14b can be reversed and that these separately-charged resin ion exchange tanks are preferably included as paired sets.

Ion exchange resins typically comprise inert materials such as cross-linked polystyrene/divinylbenzene or polymethacrylate polymers that are chemically bonded to charged ions. The ion exchange resins are preferably prepared or purchased with macropores of about 0.3 to 1.2 millimeters and a density of about 40 to 50 pounds per cubic foot, but skilled persons will appreciate that particular resins can be selected to accommodate the sizes and densities of specific contaminants based on the quality of the source fluid and the size of the contaminants.

In a preferred embodiment, an $H^+$ cationic resin and an $OH^-$ anionic resin is obtained from a commercial source. In another embodiment, the cation resin is chemically converted to a hydrogen form rather than the commercially available sodium form, and the anion resin is converted to a hydroxide form rather than the commercially available chloride form. The cation conversion can be accomplished by treating or flushing the ion exchange resin with a strong acid, such as sulfuric acid or hydrochloric acid. The anion conversion can be accomplished by treating or flushing the ion exchange resin with a strong base, such as sodium hydroxide. The ion conversion treatments can be performed prior to putting the ion exchange resin into ion exchange tanks 14 or can be performed after tanks 14 are filled with the ion exchange resin. The preferred ionic forms can be used regardless of whether the ion exchange resins are used in individual columns or as a mixed bed. It is preferable to prepare the anion and cation ion exchange resins separately and than combine them to form a mixed bed ion exchange tank 14. Preferably, the ion exchange resins are obtained from commercial suppliers in the highest purity form available to prevent secondary contamination from the resin itself. Examples of commercial resins suitable for use in the present invention include Sybron Ionac products A-641, CFP-110, and NM-201SG.

Because water reacts with many of the dielectric condensate precursor fluids to form undesirable contaminants, it is desirable to dry or otherwise eliminate water from the ion exchange resin in addition to the ion conversion. For example, water reacts with or hydrolyzes TEOS to form silicon dioxide and other particulates, which adversely affect the uniformity and performance of the dielectric layer in an integrated circuit. A preferred drying technique involves rinsing the ion exchange resin with a drying agent, such as isopropyl alcohol, n-propyl alcohol, methyl alcohol, or other evaporative alcohols. In a preferred embodiment, the ion exchange resin is flushed with a volume of drying agent that is about 3–6 times the volume of the ion exchange resin, and the drying agent can be recycled. The drying process can be performed at room temperature or at elevated temperatures if desirable, and can be performed before or after placing the ion exchange resin into ion exchange tanks 14. System 10 and, particularly, ion exchange tanks 14 are typically flushed with the supply fluid before a purification run is initiated.

A tank supply valve 18 is opened to allow fluid to flow from supply tank 12 along a supply line 20 to a pressure regulating valve 22 that precludes backward flow of fluid along supply line 20. Fluid continues along supply line 20, passes a pump valve 24, and enters pump 26. Valve 24 allows fluid to reach pump 26 that is preferably adapted to pump industrial volumes of fluid at a rate of at least 20 gallons per minute. A pressure gauge 28 displays the pressure of fluid flowing through pump line 30 between pump 26 and ion exchange tank 14a, guarded by tank entry valve 31.

After passing through ion exchange tank 14a, fluid flows through tank line 32, between tank exit valve 34 and tank entry valve 36, and into ion exchange tank 14b. After passing through ion exchange tank 14b, fluid flows through tank exit valve 38, along filter line 40, through filter valve 42, and through filter 44. Filter 44 is preferably a conventional TEFLON™ filter, such as PTFE or PFA, and removes any remaining particulates from otherwise purified fluid flowing through filter line 40. Such remaining particulates may be generally 0.05 $\mu$m or larger and can include resin particles or hydrolytic or reaction products with any unremoved water, for example.

The resin-treated fluid can be recirculated along recirculation line 46 and through valves 48 and 24 to re-enter the ion exchange tanks 14a and 14b. Alternatively or simultaneously, the resin-treated or purified fluid can be directed through collection line 50, collection valve 52, flow meter 54, and tank valve 56 into purified product collection tank 16. In one embodiment, valves 24 and 48 are fully opened and valves 22 and 52 are partly opened so that supply line 12 and collection line 50 have similar flow rates that are substantially lower than the flow rates through recirculation line 46 and pump line 30, which has an even greater flow rate. This embodiment permits a continuous supply of source fluid and a continuous collection of resin-treated fluid. The supply and collection flow rates can be adjusted to optimize the purity of the collected fluid. The process can be carried out at room temperatures, although the process may be accelerated at higher temperatures.

The energy required to effect purification in accordance with this invention is significantly lower than the energy required to purify the fluids by distillation. For example, it is expected that resin treating the fluids will require less than $0.02 per gallon while distillation requires greater than $0.35 per gallon. Even though the resin-treating process is by itself less expensive and more effective than the conventional distillation process for purifying dielectric condensate fluid precursors, skilled persons will recognize that there may be advantages to distilling the fluids prior to passing them through the ion exchange resins.

Skilled persons will appreciate that numerous alternative designs for system 10 are possible, including altered placements, varieties, and number of valves, pumps, filters, and tanks. For example, numerous product collection tanks 16 can be added in parallel with appropriate lines and valves to allow sequential filling, removal, and replacement of collection tanks 16. Alternatively, product collection tanks 16 can be supplied with exit valves and lines that lead to process chambers where the fluid can be employed, and/or supply tank 12 can receive unused process fluid from such a chamber.

Skilled persons will also appreciate that system 10 can include only one ion exchange tank 14, a large number of mixed bed ion exchange tanks 14, or paired or uneven sets of ion exchange tanks 14a and 14b in series or in parallel so that the fluid can be highly purified in a single cycle or a small number of cycles through system 10. Such multiple ion exchange tanks 14, 14a, or 14b can contain slightly different ion exchange resins having, for example, crevices of decreasing sizes and increasing numbers of crevices.

Skilled persons will also appreciate that the purity of the purified product fluid may be increased with an additional specified number of passes through ion exchange tanks 14 or until no further increase in purity can be detected. Typically 1 to 10 cycles through the ion exchange tanks 14 are performed to achieve the highest possible purity, containing less than 1 part per billion (ppb) of individual metallic contaminants.

The high purity dielectric condensate precursor fluids, silicate esters, or TEOS can be used for applications where the higher purity will benefit the quality or improve the yield of an unrelated process. Example applications include, but are not limited to, semiconductor manufacturing where an insulating dielectric layer is required on the surface of the semiconductor wafer, and in the manufacturing of precipitated amorphous silicate slurries where an organic silicate ester is a reactant or ingredient.

Major advantages of this process include significantly lower costs of purification, increased safety due to the ambient process temperatures, and significantly lower levels of boron and chloride contamination compared to existing distillation methods.

EXAMPLE 1

In this example, low purity TEOS containing greater than 1 ppb but less than 10,000 ppb of individual metallic contaminants was cycled through a system similar to system 10. Analysis of the purified fluids exhibited the general detectable levels of contaminants presented in Table 1. Skilled persons will appreciate that ppb in the table represents nanograms of contaminant per gram of fluid instead of the typical nanogram per milliliter since the fluids have a different density than water. The "less than" values are generally less than the detectable level for the particular contaminant.

TABLE 1

COMPARATIVE CONCENTRATION OF CONTAMINANTS IN ORGANIC SILICATE ESTERS
Concentration in Parts Per Billion (PPB)

| Element | Industrial Grade TEOS | Resin-Treated TEOS |
|---|---|---|
| Aluminum | <0.05 | <0.05 |
| Antimony | <0.05 | <0.05 |
| Arsenic | <0.1 | <0.1 |
| Barium | 0.07 | <0.01 |
| Beryllium | <0.05 | <0.05 |
| Bismuth | <0.05 | <0.05 |
| Boron | 59 | 0.8 |
| Cadmium | <0.01 | <0.01 |
| Calcium | 0.69 | <0.1 |
| Chromium | <0.05 | <0.05 |
| Cobalt | 0.02 | <0.01 |
| Copper | 0.41 | 0.2 |
| Gallium | <0.01 | <0.01 |
| Germanium | <0.05 | <0.05 |
| Gold | <0.1 | <0.1 |
| Iron | 3 | <0.1 |
| Lead | <0.05 | <0.05 |
| Lithium | <0.05 | <0.05 |
| Magnesium | 1.3 | <0.05 |
| Manganese | <0.05 | <0.05 |
| Molybdenum | <0.05 | <0.05 |
| Nickel | 0.08 | <0.05 |
| Niobium | <0.05 | <0.05 |
| Potassium | 0.23 | <0.1 |
| Silver | <0.05 | <0.05 |
| Sodium | 1.3 | 0.2 |
| Strontium | <0.01 | <0.01 |
| Tantalum | <0.05 | <0.05 |
| Thallium | <0.01 | <0.01 |
| Tin | 0.05 | <0.05 |
| Titanium | <0.05 | <0.05 |
| Vanadium | <0.05 | <0.05 |
| Zinc | 52 | 0.07 |
| Zirconium | <0.01 | <0.01 |
| Chloride | 500 | <1.0 |

Table 1 shows a reduction in boron contamination to less than 50 ppb, even to less than or equal to 20 ppb, preferably to less than or equal to 10 ppb, and more significantly to less than or equal to 1 ppb; a reduction in calcium contamination to less than 0.50 ppb and more significantly to less than or equal to 0.1 ppb; a reduction in copper contamination to less than 0.40 ppb and more significantly to less than or equal to 0.2 ppb; a reduction in iron contamination to less than 3 ppb and more significantly to less than or equal to 0.1 ppb; a reduction in magnesium contamination to less than 1.3 ppb and more significantly to less than or equal to 0.05 ppb; a reduction in potassium contamination to less than 0.23 ppb and more significantly to less than or equal to 0.1 ppb; a reduction in sodium contamination to less than 1.3 ppb and more significantly to less than or equal to 0.2 ppb; a reduction in zinc contamination to less than 50 ppb, preferably to less than or equal to 1 ppb and more significantly to less than or equal to 0.7 ppb; and a reduction in chloride contamination to less than 100 ppb, to less than 10 ppb, and more significantly to less than or equal to 1 ppb. Skilled persons will appreciate that these contaminant concentrations would be even lower when the fluids are resin-treated on a very large commercial scale, particularly the levels of boron would be even smaller where boron-containing silicate tanks or vessels are not employed.

It will be obvious to those having skill in the art that many changes may be made to the details of the above-described embodiment of this invention without departing from the underlying principles thereof. The scope of the present invention should, therefore, be determined only by the following claims.

What is claimed is:

1. A method for removing contaminants from a dielectric condensate precursor fluid, comprising:
    passing a dielectric condensate precursor fluid through a macroporous ion exchange resin having hydrogen cations and/or hydroxide anions to obtain a purified fluid having a concentration of boron impurities of less than or equal to than 20 ppb; and
    collecting the purified fluid.

2. The method of claim 1 in which the purified fluid comprises a concentration of boron impurities of less than or equal to 10 ppb.

3. The method of claim 2 in which the purified fluid comprises a concentration of boron impurities of less than or equal to 1 ppb.

4. The method of claim 1 in which the dielectric condensate precursor fluid has concentrations of boron impurities of greater than 10 ppb and less than 10,000 ppb.

5. The method of claim 1 in which the purified fluid comprises a silicate ester.

6. The method of claim 5 in which the purified fluid comprises tetraethylorthosilicate (TEOS).

7. The method of claim 1 in which the purified fluid comprises: hydrogen silsesquioxane (HSQ) or methyl silsesquioxane (MSQ).

8. The method of claim 1 in which the macroporous ion exchange resin removes chloride from the dielectric condensate precursor fluid and the purified fluid comprises a concentration of less than or equal to 25 ppb of chloride.

9. The method of claim 8 in which the purified fluid comprises a concentration of less than or equal to 1 ppb of chloride.

10. The method of claim 1 in which the dielectric condensate precursor fluid is passed through the macroporous ion exchange resin at room temperature.

11. The method of claim 1, further comprising:
   employing the purified fluid in a semiconductor manufacturing process.

12. The method of claim 1, further comprising:
   employing the purified fluid in a process for manufacturing silicate powders or silicate slurries.

13. The method of claim 11, further comprising:
   employing the silicate powders or silicate slurries for polishing silicon wafers or semiconductor devices.

14. The method of claim 1 in which the purified fluid comprises concentrations of individual metallic impurities of less than or equal to 1 ppb.

15. The method of claim 1 in which the dielectric condensate precursor fluid has concentrations of individual metallic impurities of greater than 1 ppb and less than 10,000 ppb.

16. The method of claim 1 in which the purified fluid, further comprises:
   a concentration of iron impurities of less than or equal to than 1 ppb;
   a concentration of sodium impurities of less than or equal to than 1 ppb;
   a concentration of magnesium impurities of less than or equal to than 1 ppb; and
   a concentration of zinc impurities of less than or equal to than 1 ppb.

17. A purified dielectric condensate precursor fluid, comprising:
   a concentration of boron impurities of less than or equal to than 10 ppb.

18. The purified dielectric condensate precursor fluid of claim 17, comprising:
   a concentration of boron impurities of less than or equal to 1 ppb.

19. The purified dielectric condensate precursor fluid of claim 18 in which the purified fluid comprises a silicate ester.

20. The purified dielectric condensate precursor fluid of claim 19 in which the purified fluid comprises tetraethylorthosilicate (TEOS) or methyltriethoxyorthosilicate (MTEOS).

21. The purified dielectric condensate precursor fluid of claim 18 in which the purified fluid comprises: hydrogen silsesquioxane (HSQ) or methyl silsesquioxane (MSQ).

22. The purified dielectric condensate precursor fluid of claim 18 in which the purified fluid comprises a concentration of less than or equal to 1 ppb of chloride impurities.

23. The purified dielectric condensate precursor fluid claim 18 in which the purified fluid, further comprises:
   a concentration of iron impurities of less than or equal to than 1 ppb;
   a concentration of sodium impurities of less than or equal to than 1 ppb;
   a concentration of magnesium impurities of less than or equal to than 1 ppb; and
   a concentration of zinc impurities of less than or equal to than 1 ppb.

24. The purified dielectric condensate precursor fluid of claim 23, further comprising:
   a concentration of aluminum impurities of less than or equal to than 0.1 ppb;
   a concentration of antimony impurities of less than or equal to than 0.1 ppb;
   a concentration of arsenic impurities of less than or equal to than 0.1 ppb;
   a concentration of barium impurities of less than or equal to than 0.1 ppb;
   a concentration of beryllium impurities of less than or equal to than 0.1 ppb;
   a concentration of bismuth impurities of less than or equal to than 0.1 ppb;
   a concentration of cadmium impurities of less than or equal to than 0.1 ppb;
   a concentration of calcium impurities of less than or equal to than 0.1 ppb;
   a concentration of chromium impurities of less than or equal to than 0.1 ppb;
   a concentration of cobalt impurities of less than or equal to than 0.1 ppb;
   a concentration of copper impurities of less than or equal to than 1 ppb;
   a concentration of gallium impurities of less than or equal to than 0.1 ppb;
   a concentration of germanium impurities of less than or equal to than 0.1 ppb;
   a concentration of gold impurities of less than or equal to than 0.1 ppb;
   a concentration of lead impurities of less than or equal to than 0.1 ppb;
   a concentration of lithium impurities of less than or equal to than 0.1 ppb;
   a concentration of manganese impurities of less than or equal to than 0.1 ppb;
   a concentration of molybdenum impurities of less than or equal to than 0.1 ppb;
   a concentration of nickel impurities of less than or equal to than 0.1 ppb;
   a concentration of niobium impurities of less than or equal to than 0.1 ppb;
   a concentration of potassium impurities of less than or equal to than 0.1 ppb;
   a concentration of silver impurities of less than or equal to than 0.1 ppb;
   a concentration of strontium impurities of less than or equal to than 0.1 ppb;
   a concentration of tantalum impurities of less than or equal to than 0.1 ppb;
   a concentration of thallium impurities of less than or equal to than 0.1 ppb;

a concentration of tin impurities of less than or equal to than 0.1 ppb;

a concentration of titanium impurities of less than or equal to than 0.1 ppb;

a concentration of vanadium impurities of less than or equal to than 0.1 ppb; and a concentration of zirconium impurities of less than or equal to than 0.1 ppb.

25. A system for purifying a dielectric condensate precursor fluid, comprising:

a supply tank for storing the dielectric condensate precursor fluid;

a macroporous ion exchange resin having hydrogen cations and/or hydroxide anions for removing individual metallic impurities from the dielectric condensate precursor fluid; and a collection tank to collect purified fluid having concentrations of boron impurities of less than or equal to than 20 ppd.

26. A method for removing contaminants from a dielectric condensate precursor fluid, comprising:

passing a dielectric condensate precursor fluid though a macroporous ion exchange resin having hydrogen cations and/or hydroxide anions to obtain a purified fluid having a concentration of chloride impurities of less than or equal to than 10 ppb; and collecting the purified fluid.

27. A method for removing contaminants from a dielectric condensate precursor fluid, comprising:

passing a dielectric condensate precursor fluid though a macroporous ion exchange resin having hydrogen cations and/or hydroxide anions to obtain a purified dielectric condensate precursor fluid having concentrations of individual metallic impurities of less than or equal to than 1 ppb; and collecting the purified fluid.

28. A method of claim 1 in which macroporous ion exchange resin is predried.

29. The system of claim 25 in which macroporous ion exchange resin is predried.

30. The method of claim 26 in which macroporous ion exchange resin is predried.

31. The method of claim 27 in which macroporous ion exchange resin is predried.

32. The system of claim 25 in which the purified fluid comprises a concentration of boron impurities of less than or equal to 10 ppb.

33. The system of claim 32 in which the purified fluid comprises a concentration of boron impurities of less than or equal to 1 ppb.

34. The system of claim 25 in which the dielectric condensate precursor fluid has concentrations of boron impurities of greater than 10 ppb and less than 10,000 ppb.

35. The system of claim 25 in which the purified fluid comprises a silicate ester.

36. The system of claim 35 in which the purified fluid comprises tetraethylorthosilicate (TEOS).

37. The system of claim 25 in which the purified fluid comprises: hydrogen silsesquioxane (HSQ) or methyl silsesquioxane (MSQ).

38. The system of claim 25 in which the macroporous ion exchange resin removes chloride from the dielectric condensate precursor fluid and the purified fluid comprises a concentration of less than or equal to 25 ppb of chloride.

39. The system of claim 38 in which the purified fluid comprises a concentration of less than or equal to 1 ppb of chloride.

40. The system of claim 25 in which the dielectric condensate precursor fluid is passed through the macroporous ion exchange resin at room temperature.

41. The system of claim 25 in which the purified fluid comprises concentrations of individual metallic impurities of less than or equal to 1 ppb.

42. The system of claim 25 in which the dielectric condensate precursor fluid has concentrations of individual metallic impurities of greater than 1 ppb and less than 10,000 ppb.

43. The system of claim 25 in which the purified fluid, further comprises:

a concentration of iron impurities of less than or equal to than 1 ppb;

a concentration of sodium impurities of less than or equal to than 1 ppb;

a concentration of magnesium impurities of less than or equal to than 1 ppb; and a concentration of zinc impurities of less than or equal to than 1 ppb.

44. The method of claim 26 in which the purified fluid comprises a silicate ester.

45. The method of claim 44 in which the purified fluid comprises tetraethylorthosilicate (TEOS).

46. The method of claim 26 in which the purified fluid comprises: hydrogen silsesquioxane (HSQ) or methyl silsesquioxane (MSQ).

47. The method of claim 26 in which the purified fluid comprises a concentration of less than or equal to 1 ppb of chloride.

48. The method of claim 26 in which the dielectric condensate precursor fluid is passed though the macroporous ion exchange resin at room temperature.

49. The method of claim 26, further comprising:

employing the purified fluid in a semiconductor manufacturing process.

50. The method of claim 26, further comprising:

employing the purified fluid in a process for manufacturing silicate powders or silicate slurries.

51. The method of claim 50, further comprising:

employing the silicate powders or silicate slurries for polishing silicon wafers or semiconductor devices.

52. The method of claim 26 in which the purified fluid comprises concentrations of individual metallic impurities of less than or equal to 1 ppb.

53. The method of claim 26 in which the dielectric condensate precursor fluid has concentrations of individual metallic impurities of greater than 1 ppb and less than 10,000 ppb.

54. The method of claim 26 in which the purified fluid, further comprises:

a concentration of iron impurities of less than or equal to than 1 ppb;

a concentration of sodium impurities of less than or equal to than 1 ppb;

a concentration of magnesium impurities of less than or equal to than 1 ppb; and a concentration of zinc impurities of less than or equal to than 1 ppb.

55. The method of claim 27 in which the purified fluid comprises a silicate ester.

56. The method of claim 55 in which the purified fluid comprises tetraethylorthosilicate (TEOS).

57. The method of claim 27 in which the purified fluid comprises: hydrogen silsesquioxane (HSQ) or methyl silsesquioxane (MSQ).

58. The method of claim 27 in which the dielectric condensate precursor fluid is passed through the macroporous ion exchange resin at room temperature.

59. The method of claim 27, further comprising:
employing the purified fluid in a semiconductor manufacturing process.

60. The method of claim 27, further comprising:
employing the purified fluid in a process for manufacturing silicate powders or silicate slurries.

61. The method of claim 60, further comprising:
employing the silicate powders or silicate slurries for polishing silicon wafers or semiconductor devices.

62. The method of claim 27 in which the dielectric condensate precursor fluid has concentrations of individual metallic impurities of greater than 1 ppb and less than 10,000 ppb.

63. The method of claim 1 in which the purified fluid comprises a polyarylene ether.

64. The method of claim 1 in which the purified fluid comprises benzocyclobutene (BCB).

65. The method of claim 1 in which the purified fluid comprises an OSG.

66. The purified dielectric condensate precursor fluid of claim 18 in which the purified fluid comprises a polyarylene ether.

67. The purified dielectric condensate precursor fluid of claim 18 in which the purified fluid comprises benzocyclobutene (BCB).

68. The purified dielectric condensate precursor fluid of claim 18 in which the purified fluid comprises an OSG.

69. The system of claim 25 in which the purified fluid comprises a polyarylene ether.

70. The system of claim 25 in which the purified fluid comprises benzocyclobutene (BCB).

71. The system of claim 25 in which the purified fluid comprises an OSG.

72. The method of claim 26 in which the purified fluid comprises a polyarylene ether.

73. The method of claim 26 in which the purified fluid comprises benzocyclobutene (BCB).

74. The method of claim 26 in which the purified fluid comprises an OSG.

75. The method of claim 27 in which the purified fluid comprises a polyarylene ether.

76. The method of claim 27 in which the purified fluid comprises benzocyclobutene (BCB).

77. The method of claim 27 in which the purified fluid comprises an OSG.

* * * * *